US011695801B2

(12) United States Patent
Ohashi et al.

(10) Patent No.: US 11,695,801 B2
(45) Date of Patent: Jul. 4, 2023

(54) COMMUNICATION DEVICE AND SYSTEM (71) Applicant: KABUSHIKI KAISHA TOKAI RIKA DENKI SEISAKUSHO, Aichi (JP)

(72) Inventors: Yosuke Ohashi, Aichi (JP); Masateru Furuta, Aichi (JP); Yuki Kono, Aichi (JP); Shigenori Nitta, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/351,379

(22) Filed: Jun. 18, 2021

(65) Prior Publication Data
US 2022/0086188 A1 Mar. 17, 2022

(30) Foreign Application Priority Data

Sep. 14, 2020 (JP) .................................. 2020-153476

(51) Int. Cl.
*H04W 12/50* (2021.01)
*H04L 9/40* (2022.01)
*H04W 12/64* (2021.01)
*H04W 76/15* (2018.01)
*H04W 12/43* (2021.01)

(52) U.S. Cl.
CPC ............ *H04L 63/18* (2013.01); *H04L 63/105* (2013.01); *H04W 12/43* (2021.01); *H04W 12/50* (2021.01); *H04W 12/64* (2021.01); *H04W 76/15* (2018.02)

(58) Field of Classification Search
None
See application file for complete search history.

(56) References Cited

U.S. PATENT DOCUMENTS

| 2018/0162321 A1* | 6/2018 | Spiess ................ G07C 9/00309 |
| 2019/0051072 A1* | 2/2019 | Okada .................. H04B 1/7163 |
| 2020/0198580 A1* | 6/2020 | Saleh ...................... B60R 25/24 |

FOREIGN PATENT DOCUMENTS

JP 11-208419 8/1999

* cited by examiner

*Primary Examiner* — Nelson S. Giddins
(74) *Attorney, Agent, or Firm* — Greenblum & Bernstein, P.L.C.

(57) ABSTRACT

To realize more secured Authentication while convenience is secured. There is provided a communication device including a control unit configured to control a process relating to transmission or reception of a first authentication signal and a second authentication signal used for a first authentication process that is authentication between the communication device and another communication device, in which the control unit further controls a second authentication process that is authentication different from the first authentication process and starts a process relating to transmission or reception of signals used for a second authentication process that is authentication different from the first authentication process before transmission or reception of the first authentication signal.

14 Claims, 4 Drawing Sheets

COMMUNICATION DEVICE AND SYSTEM

CROSS REFERENCE TO RELATED APPLICATION(S)

This application is based upon and claims benefit of priority from Japanese Patent Application No. 2020-153476, filed on Sep. 14, 2020, the entire contents of which are incorporated herein by reference.

BACKGROUND

The present invention relates to a communication device and a system.

In recent years, technologies for performing authentication on the basis of results of transmission/reception of signals between devices have been developed. For example, in the following Japanese Patent Application Laid-Open No. H11-208419, a system in which authentication of a portable device is performed by an in-vehicle device transmitting/receiving signals to/from the portable device is disclosed.

SUMMARY

In order to improve the security of the system as described above, the configuration of authentication may be assumed to be made complicated. However, in such a case, there is a likelihood of reducing a user's convenience.

The present invention is made in view of the problems described above, and an objective of the present invention is to realize secured inter-device authentication while convenience is secured.

In other to solve the problems described above, according to one aspect of the present invention, there is provided a communication device including a control unit configured to control a process relating to transmission or reception of a first authentication signal and a second authentication signal used for a first authentication process that is authentication between the communication device and another communication device, in which the control unit further controls a second authentication process that is authentication different from the first authentication process and starts a process relating to transmission or reception of signals used for a second authentication process that is authentication different from the first authentication process before transmission or reception of the first authentication signal.

In addition, in order to solve the problems described above, according to another aspect of the present invention, there is provided a system including: a first communication device; and a second communication device, in which the first communication device includes a first control unit configured to control a process relating to transmission of a first authentication signal used for a first authentication process that is authentication between the first communication device and the second communication device and reception of a second authentication signal, the second communication device includes a second control unit configured to control a process relating to reception of the first authentication signal and transmission of the second authentication signal, and the second control unit transmits a signal used for a second authentication process that is authentication different from the first authentication process before reception of the first authentication signal.

The present invention is made in view of the problems described above, and an objective of the present invention is to realize secured inter-device authentication while convenience is secured.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Embodiment

1.1. Overview

First, an overview of an embodiment of the present invention will be described. As described above, in recent years, a technology for performing authentication on the basis of results of transmission/reception of signals between devices has been developed. For example, in Japanese Patent Application Laid-Open No. H11-208419, a technology for performing authentication of a portable device using an in-vehicle device transmitting/receiving signals to/from the portable device is disclosed.

By using such an authentication technology, for example, when a user having an authenticated portable device comes within a predetermined distance from a vehicle, functions for releasing door locking of the vehicle, enabling starting of an engine, and the like can be realized.

However, for example, in a case in which inter-device authentication is performed in accordance with a request and answer system using an ultra-high frequency (UHF) or a low frequency (LF), by indirectly realizing communication between a portable device (a device to be authenticated) and an in-vehicle device by relaying a signal transmitted by the in-vehicle device using a relay device, there is concern about a relay attack in which authentication of the portable device using the in-vehicle device is fraudulently established.

For this reason, a structure for preventing camouflage and the like of a device to be authenticated such as in the relay attack described above and further improving authentication accuracy is desired.

For this reason, in a system 1 according to one embodiment of the present disclosure, in addition to a first authentication process that is an authentication between communication devices, a second authentication process that is an authentication different from the first authentication process may be executed. In this way, by using a plurality of authentication processes in combination, security is enhanced, and camouflage and the like of a device to be authenticated as described above can be prevented.

However, here, in a case in which a user needs to perform an additional operation when the first authentication process and the second authentication process are executed, there is a likelihood of the convenience being reduced. For this reason, it is preferable to execute the first authentication process and the second authentication process in series without their being recognized by a user.

A technical idea of the present invention is obtained with focusing on the points described above and realizes secured inter-device authentication while convenience is secured.

For this reason, a communication device according to this embodiment includes a control unit that controls a process relating to transmission/reception of a first authentication signal and a second authentication signal used for a first authentication process that is authentication between the communication device and another communication device.

In addition, the control unit described above may also control a second authentication process that is authentication different from the first authentication process and have one feature of starting a process relating to transmission or reception of a signal used for the second authentication process that is authentication different from the first authentication process before transmission or reception of the first authentication signal.

In other words, in the system according to this embodiment, transmission/reception of signals used for the second authentication process is performed before transmission/reception of signals used for the first authentication process, which is one of the features.

According to the control described above, the first authentication process and the second authentication process can be executed in series without being recognized by a user, and secured inter-device authentication can be realized while convenience is secured.

Here, the first authentication process according to this embodiment may be an authentication process based on a first authentication signal transmitted by one communication device and a second authentication signal transmitted by another communication device as a response to the first authentication signal.

In such a case, the control unit according to this embodiment may start a process relating to transmission or reception of signals used for the second authentication process before transmission or reception of the first authentication signal.

The process relating to transmission of signals used for the second authentication process described above may include a process of generating a signal transmitted to another communication device through a wireless communication unit.

The process relating to reception of signals used for the second authentication process described above may include a process of starting to wait for reception of signals transmitted from another communication device.

Hereinafter, an example of the configuration of the system according to this embodiment will be described in detail.

1.2. System Configuration Example

Figure 1:
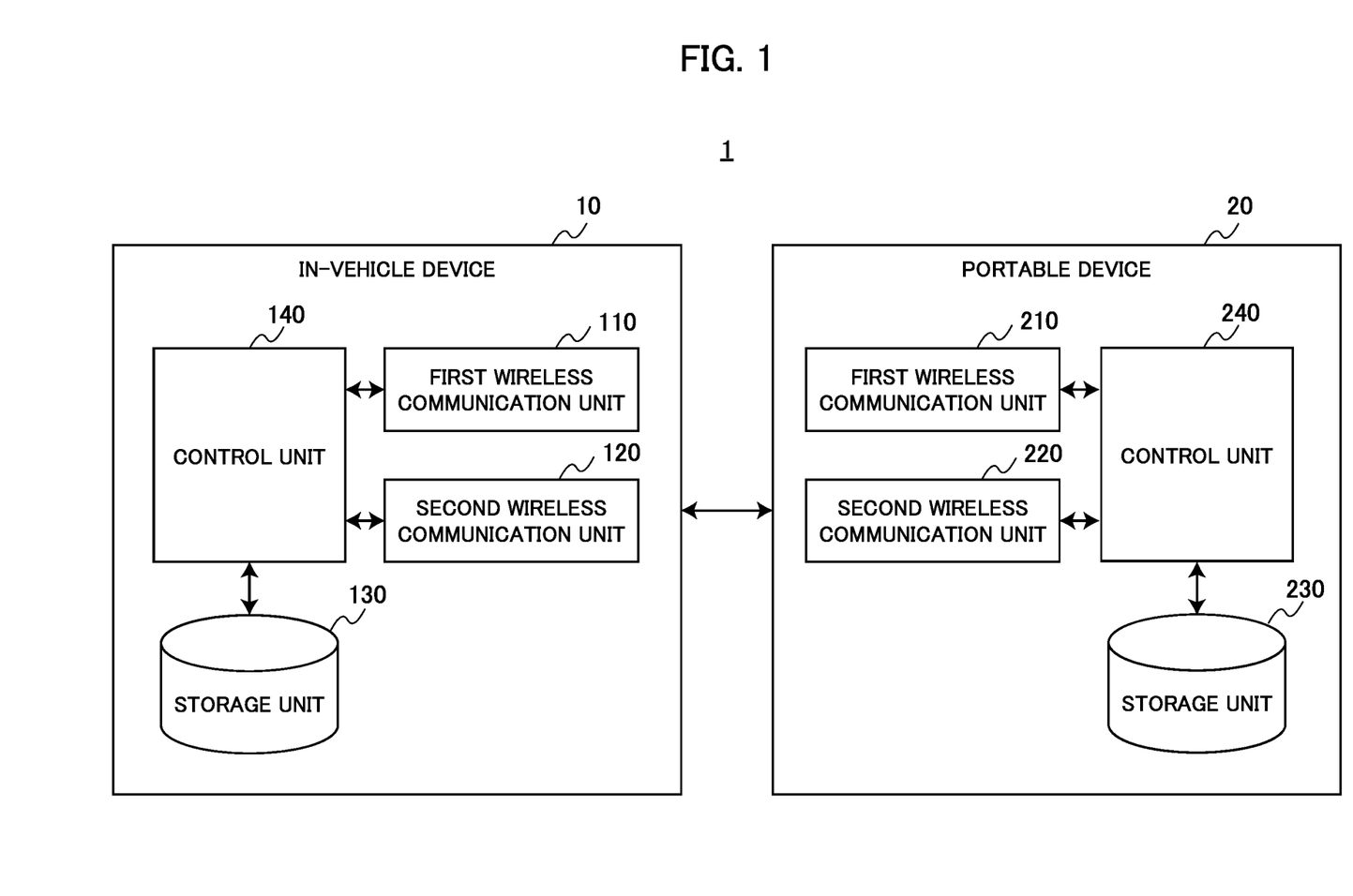
FIG. 1 is a block diagram illustrating an example of the configuration of a system 1 according to an embodiment of the present invention.

FIG. 1 is a block diagram illustrating an example of the configuration of the system 1 according to this embodiment. As illustrated in FIG. 1, the system 1 according to this embodiment includes an in-vehicle device 10 and a portable device 20.

(In-Vehicle Device 10)

The in-vehicle device 10 according to this embodiment is an example of a first communication device. The in-vehicle device 10 according to this embodiment may be a communication device that is mounted in a vehicle in which a user is allowed to ride (for example, a vehicle owned by the user or a vehicle that is temporarily rented by the user).

As illustrated in FIG. 1, the in-vehicle device 10 according to this embodiment includes a first wireless communication unit 110, a second wireless communication unit 120, a storage unit 130, and a control unit 140.

(First Wireless Communication Unit 110)

The first wireless communication unit 110 according to this embodiment performs transmission/reception of signals used for the first authentication process to/from the portable device 20 under the control of the control unit 140.

In the first authentication process according to this embodiment, signals may be used in compliance with a first wireless communication standard. For example, the first wireless communication unit 110 according to this embodiment may transmit and receive signals of an LF band or a UHF band.

(Second Wireless Communication Unit 120)

The second wireless communication unit 120 according to this embodiment performs transmission/reception of signals used for the second authentication process for the portable device 20 under the control of the control unit 140.

In the second authentication process according to this embodiment, signals may be transmitted and received in compliance with a second wireless communication standard using a carrier wave of a frequency different from a frequency of a carrier wave in the first wireless communication standard. In accordance with this, interference of signals between the first authentication process and the second authentication process can be prevented.

For example, in the second authentication process according to this embodiment, signals may be transmitted and received in compliance with the second wireless communication standard using a carrier wave of a frequency higher than the frequency of the carrier wave according to the first wireless communication standard. In such a case, the power consumption of the reception side in the first authentication process can be reduced.

For example, the second wireless communication unit 120 according to this embodiment may transmit and receive signals of an ultra wide band (UWB) (hereinafter, also referred to as UWB signals).

(Storage Unit 130)

The storage unit 130 according to this embodiment stores various kinds of information used for operations performed by the in-vehicle device 10. For example, the storage unit 130 stores a program used for operations performed by the in-vehicle device 10, identification information such as an identifier (ID), key information such as a password, an authentication algorithm, and the like. For example, the storage unit 130 is composed of a storage medium such as a flash memory and a processing device that executes recording and reproduction for the storage medium.

(Control Unit 140)

The control unit 140 according to this embodiment controls components included in the in-vehicle device 10.

For example, the control unit 140 according to this embodiment controls transmission of a first authentication signal used for the first authentication process using the first wireless communication unit 110 and reception of a second authentication signal.

For example, the first authentication process according to this embodiment may be a request response authentication. Here, the request response authentication is a system in which an authenticating unit generates an authentication request and transmits the generated authentication request to a unit to be authenticated, the unit to be authenticated generates an authentication response on the basis of the authentication request and transmits the generated authentication response to the authenticating unit, and the authenticating unit performs authentication of the unit to be authenticated on the basis of the authentication response In other words, the first authentication signal according to this embodiment corresponds to the authentication request described above. In addition, the second authentication signal according to this embodiment corresponds to the authentication response described above.

Examples of the authentication request and the authentication response include a request for a password set in advance, a password transmitted in response to the request, and the like.

The authentication request and the authentication response may be those using a one-time password. In such a case, for example, a random number generated each time may be included in the first authentication signal.

The portable device 20 that is a unit to be authenticated performs an arithmetic operation using a prescribed algorithm using a random number included in the first authentication signal and information to be authenticated (for example, a password or the like), and a result of the arithmetic operation is included in the second authentication signal and transmitted to the in-vehicle device 10.

In addition, the control unit 140 of the in-vehicle device 10 that is the authenticating unit performs an arithmetic operation using a prescribed algorithm using the generated random number and the information of the portable device 20 to be authenticated that are stored in the storage unit 130 and compares a result of the arithmetic operation with the received second authentication signal. Here, in a case in which both coincide with each other, the control unit 140 may approve the first authentication process (in other words, the authenticity of the portable device 20 may be recognized).

In addition, the control unit 140 according to this embodiment controls transmission/reception of signals, which are used for the second authentication process, using the second wireless communication unit 120. At this time, before transmitting the first authentication signal to the first wireless communication unit 110, the control unit 140 according to this embodiment starts a process relating to transmission/reception of signals using the second wireless communication unit 120, which is one of features.

Here, the second authentication process according to this embodiment may include distance measurement for estimating a distance between the in-vehicle device 10 and the portable device 20 (more accurately, a distance between the second wireless communication unit 120 included in the in-vehicle device 10 and the second wireless communication unit 220 included in the portable device 20) and an authentication process based on the distance measurement.

In addition, the distance measurement described above may include transmitting a first distance measurement signal from any one of the in-vehicle device 10 or the portable device 20, receiving a second distance measurement signal from the other as a response to the first distance measurement signal, and estimating a distance between the in-vehicle device 10 and the portable device 20 on the basis of times required for the first distance measurement signal and the second distance measurement signal, in other words, calculating a distance measurement value.

In such a case, the control unit 140 according to this embodiment may approve the second authentication process in a case in which a distance between the in-vehicle device 10 and the portable device 20 is estimated to be within a prescribed range on the basis of a result of the distance measurement, in other words, in a case in which the distance measurement value is equal to or smaller than a prescribed value.

In addition, as described above, transmission/reception of the first distance measurement signal and the second distance measurement signal according to this embodiment is executed in compliance with the second wireless communication standard. For example, UWB signals may be used in the second wireless communication standard according to this embodiment. In accordance with this, an air propagation time of electric waves can be measured with high accuracy by using electric waves having a very short pulse width that is equal to or smaller than a nanosecond, and position measurement and distance measurement based on the propagation time can be performed with high accuracy.

In addition, the control unit 140 according to this embodiment may cause a device to be controlled, which is mounted in a vehicle in which the in-vehicle device 10 is mounted, to execute a prescribed process in a case in which both the first authentication process and the second authentication process are approved.

Examples of the above-described device to be controlled may be doors, an engine, and the like. The control unit 140 may perform control of unlocking of the doors, permission of starting of the engine, or the like in a case in which the first authentication process and the second authentication process are approved.

According to the control as described above, in a case in which the authenticity of the portable device 20 is recognized in the first authentication process, and the portable device 20 is estimated to be located within a prescribed distance from the in-vehicle device 10 in the second authentication process, a user can be allowed to use the vehicle.

In accordance with this, it is possible to prevent camouflage of a device to be authenticated such as in a relay attack and camouflage of a distance, and to realize more secure inter-device authentication.

The functions of the control unit 140 according to this embodiment can be realized by a processor such as a CPU.

(Portable Device 20)

The portable device 20 according to this embodiment is an example of a second communication device that is carried by a user. For example, the portable device 20 according to this embodiment may be an electronic key, a smartphone, a wearable terminal, or the like.

As illustrated in FIG. 1, the portable device 20 according to this embodiment includes a first wireless communication unit 210, a second wireless communication unit 220, a storage unit 230, and a control unit 240.

(First Wireless Communication Unit 210)

The first wireless communication unit 210 according to this embodiment performs transmission/reception of signals used for the first authentication process for the in-vehicle device 10 under the control of the control unit 240.

(Second Wireless Communication Unit 220)

The second wireless communication unit 220 according to this embodiment transmits/receives signals, which are used for the second authentication process, to/from the in-vehicle device 10 under the control of the control unit 240.

(Storage Unit 230)

The storage unit 230 according to this embodiment stores various kinds of information used for operations performed by the portable device 20. For example, the storage unit 230 stores a program used for operations performed by the portable device 20, identification information such as an identifier (ID), key information such as a password, an authentication algorithm, and the like. For example, the storage unit 230 is composed of a storage medium such as a flash memory and a processing device that executes recording/reproduction for the storage medium.

(Control Unit 240)

The control unit 240 according to this embodiment controls each component included in the portable device 20.

For example, the control unit 240 according to this embodiment controls reception of the first authentication signal used for the first authentication process using the first wireless communication unit 210 and transmission of the second authentication signal.

In addition, the control unit 240 according to this embodiment controls transmission/reception of signals used for the second authentication process using the second wireless communication unit 220. At this time, before the first wireless communication unit 110 receives a second authentication signal, the control unit 240 according to this embodiment starts a process relating to transmission/reception of signals using the second wireless communication unit 220, which is one of features.

As above, an example of the configuration of the system 1 according to this embodiment has been described. The configuration described above with reference to FIG. 1 is merely one example, and the configuration of the system 1 according to this embodiment is not limited to the related example. The configuration of the system 1 according to this embodiment can be flexibly modified in accordance with specifications and operations.

1.3. Flow of Operation

Figure 2:
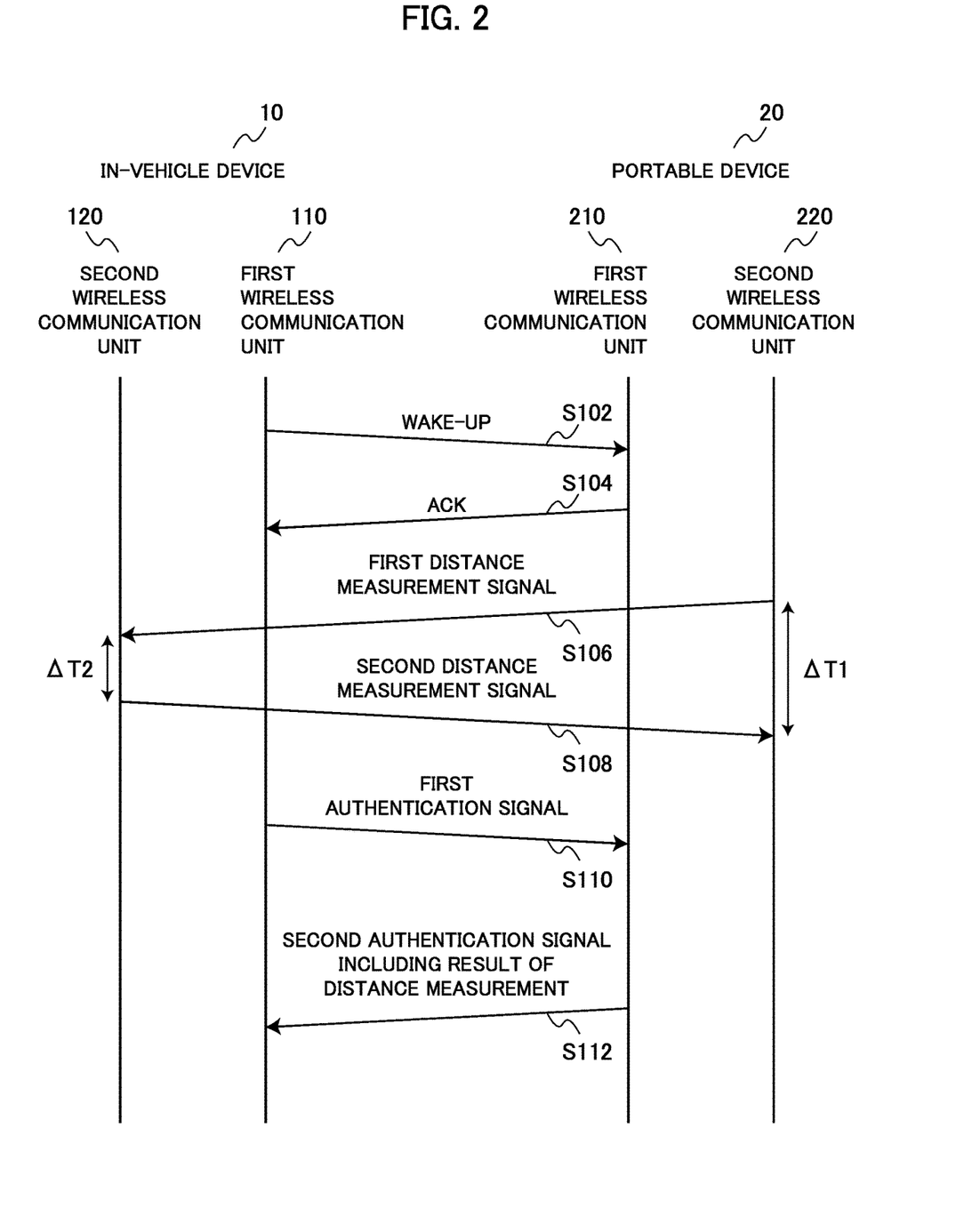
FIG. 2 is a sequence diagram illustrating an example of the flow of operations performed by the system 1 according to the embodiment.
Figure 3:
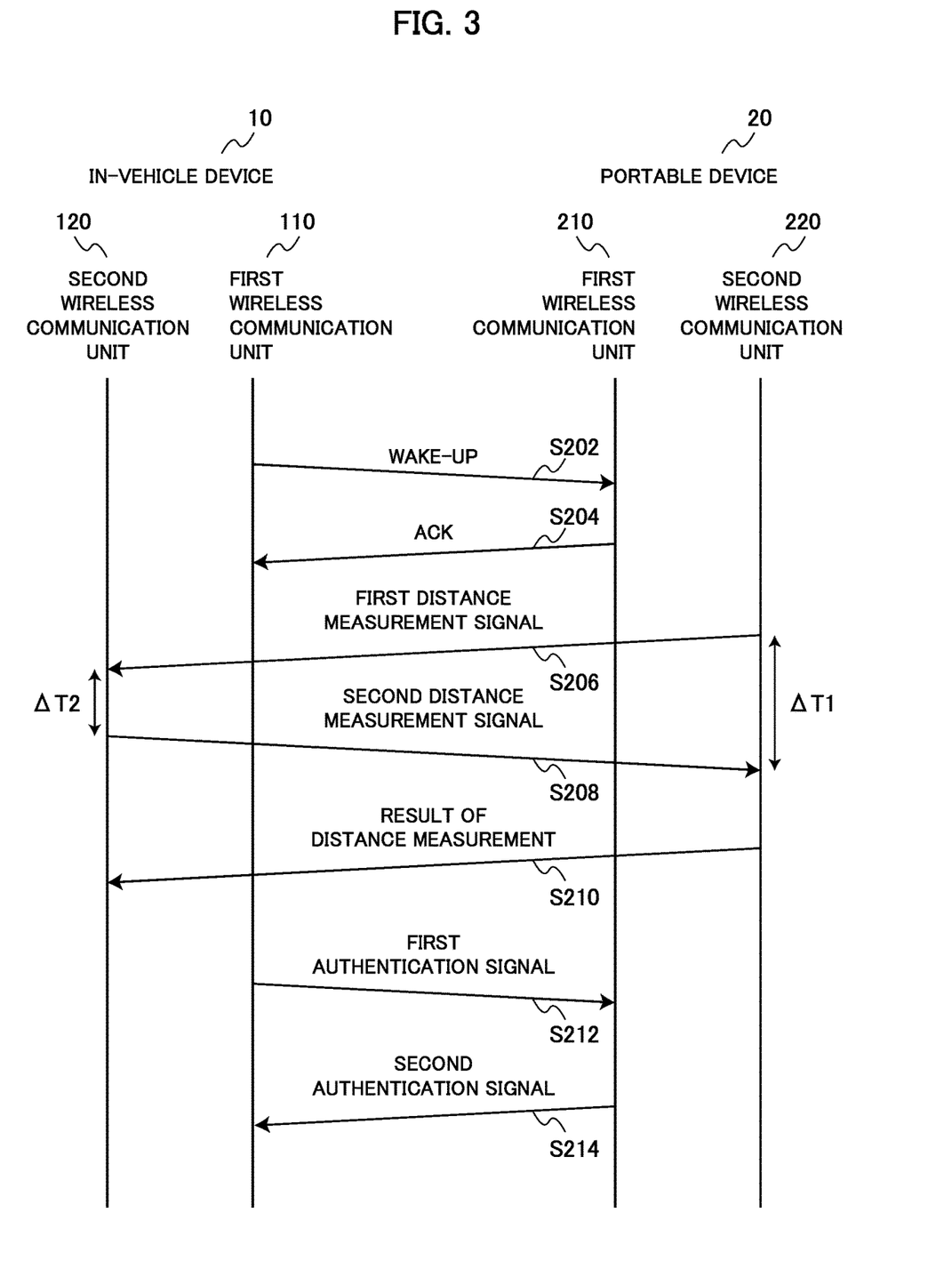
FIG. 3 is a sequence diagram illustrating an example of the flow of operations performed by the system 1 according to the embodiment.
Figure 4:
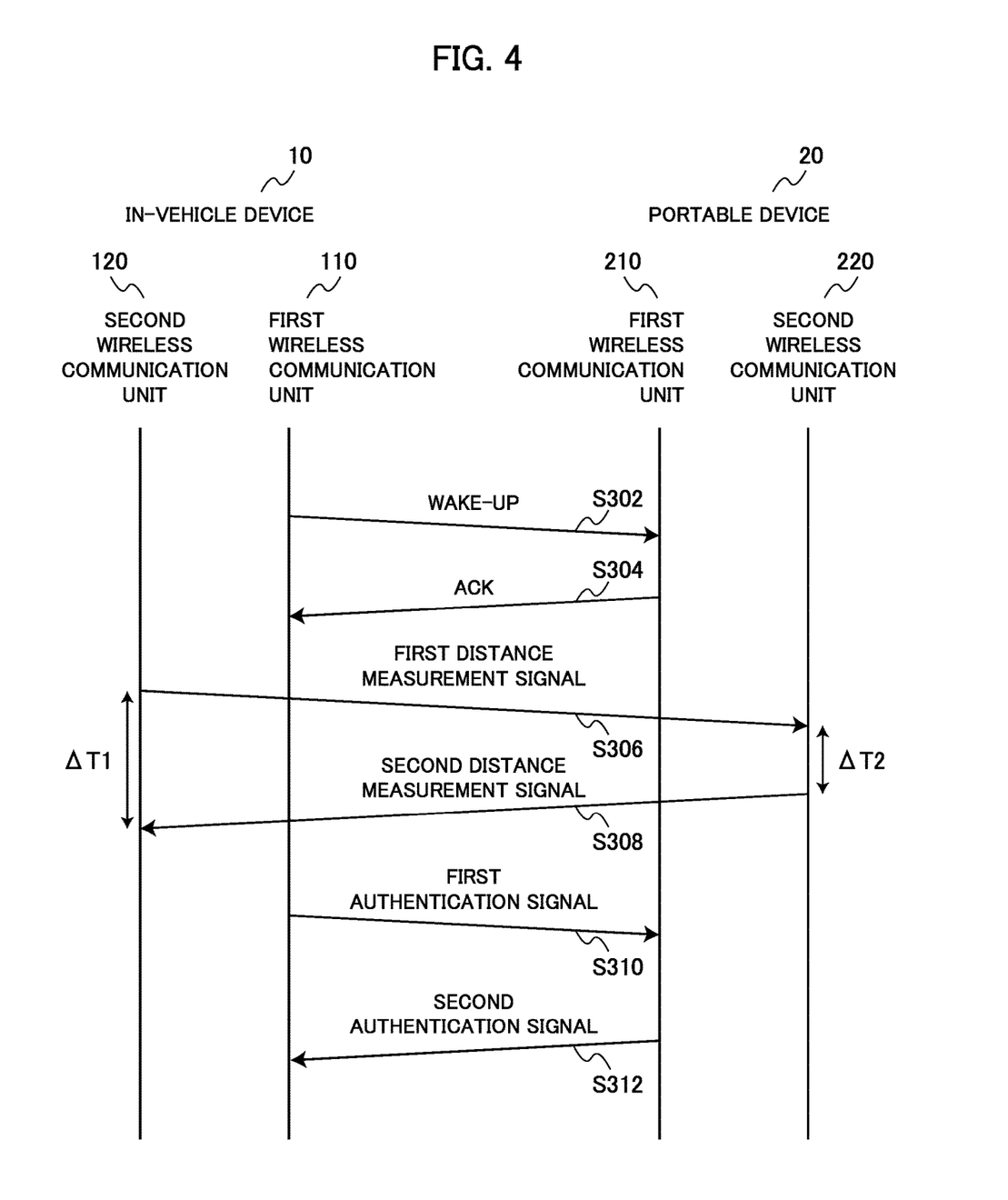
FIG. 4 is a sequence diagram illustrating an example of the flow of operations performed by the system 1 according to the embodiment.

Next, the flow of the operations of the system 1 according to this embodiment will be described with reference to a specific example. FIGS. 2 to 4 are sequence diagrams illustrating an example of the flow of operations performed by the system 1 according to the embodiment.

First, description will be presented with reference to FIG. 2. In the example illustrated in FIG. 2, first, the control unit 140 of the in-vehicle device 10 causes the first wireless communication unit 110 to transmit a wakeup signal that is a start instruction signal (S102).

The first wireless communication unit 110 may transmit a wakeup signal as a signal of the LF band or a signal of the UFH band under the control of the control unit 140.

Next, the control unit 240 of the portable device 20 causes the first wireless communication unit 210 to transmit an acknowledgement (ACK) signal that indicates start as a response to a wakeup signal (S104).

Here, the control unit 240 of the portable device 20 according to this embodiment, after performing control such that an Ack signal is transmitted as a response to the wakeup signal, may cause the second wireless communication unit 220 to start a process relating to transmission of a first distance measurement signal (S106).

On the other hand, the control unit 140 of the in-vehicle device 10 according to this embodiment, after receiving an Ack signal, causes the second wireless communication unit 120 to start a process relating to reception of a first distance measurement signal (a waiting process) and receive the first distance measurement signal.

In Step S108, after receiving the first distance measurement signal, the second wireless communication unit 120 of the in-vehicle device 10 transmits a second distance measurement signal as a response to the first distance measurement signal (S108).

In addition, in Step S110, after the second wireless communication unit 120 transmits the second distance measurement signal, the control unit 140 of the in-vehicle device 10 causes the first wireless communication unit 110 to transmit a first authentication signal (S110).

Next, in the example illustrated in FIG. 2, the control unit 240 of the portable device 20 causes the first wireless communication unit 210 to transmit the second authentication signal in which a result of distance measurement based on the first distance measurement signal transmitted in Step S106 and the second distance measurement signal received in Step S108 is included (S112).

A distance measurement value calculated on the basis of the first distance measurement signal and the second distance measurement signal may be included in the result of the distance measurement described above. The distance measurement value is calculated on the basis of a time $\Delta T1$ from a time when the second wireless communication unit 220 of the portable device 20 transmits the first distance measurement signal in Step S106 to a time when the second distance measurement signal is received in Step S108 and a time $\Delta T2$ from a time when the second wireless communication unit 120 of the in-vehicle device 10 receives the first distance measurement signal in Step S106 to a time when the second distance measurement signal is transmitted in Step S108.

More specifically, by subtracting the time $\Delta T2$ from the time $\Delta T1$, a time required for round-trip communication of a distance measurement signal is calculated, and, a time required for one-way communication of the distance measurement signal is calculated by dividing the corresponding time by 2. In addition, by multiplying the value of (the time $\Delta T1$–the time $\Delta T2$)/2 by the speed of the signal, a distance measurement value that is an estimated value of the distance between the in-vehicle device 10 and the portable device 20 can be calculated.

The calculation of a distance measurement value may be performed either by the second wireless communication unit 220 or by the control unit 240.

Information relating to the time $\Delta T2$ may be transmitted to the portable device 20 with being included in the second distance measurement signal. On the other hand, by setting the time $\Delta T2$ to a fixed time in advance and sharing the fixed time between the in-vehicle device 10 and the portable device 20, transmission/reception of the information relating to the time $\Delta T2$ can be omitted.

The control unit 140 of the in-vehicle device 10 executes the first authentication process and the second authentication process on the basis of the second authentication signal including the result of the distance measurement received by the first wireless communication unit 110 in Step S216 and controls a device, which is included in the vehicle, to be controlled on the basis of results of both the authentication processes.

As above, one example of the flow of operations performed by the system 1 according to this embodiment has been described with reference to FIG. 2.

Next, another example relating to the flow of operations performed by the system 1 according to this embodiment will be described with reference to FIG. 3.

Operations performed in Steps S202 to S208 illustrated in FIG. 3 may be the same as the operations performed in Steps S102 to S108 illustrated in FIG. 2, and thus detailed description thereof will be omitted.

In the example illustrated in FIG. 3, after the second wireless communication unit 220 of the portable device 20 receives the second distance measurement signal in Step S208, the control unit 240 causes the second wireless communication unit 220 to transmit a result of distance measurement to the in-vehicle device 10 (S210).

In this way, the control unit 240 according to this embodiment may transmit a result of the distance measurement as a signal separate from the second authentication signal.

In such a case, the control unit 140 of the in-vehicle device 10 executes the second authentication process on the basis of the result of the distance measurement received by the second wireless communication unit 120 in Step S210.

In addition, the control unit 140 of the in-vehicle device 10 causes the first wireless communication unit 110 to transmit a first authentication signal used for the first authentication process (S212).

Next, the control unit 240 of the portable device 20 causes the first wireless communication unit 210 to transmit a second authentication signal as a response to the first authentication signal (S214).

The control unit 140 of the in-vehicle device 10 executes the first authentication process on the basis of the second authentication process received by the first wireless communication unit 110 in Step S214 and controls a device, which is included in the vehicle, to be controlled on the basis of a result of the first authentication process and the result of the second authentication process.

As above, one example of the flow of operations performed by the system 1 according to this embodiment has been described with reference to FIG. 3.

Next, another example of the flow of operations performed by the system 1 according to this embodiment will be described with reference to FIG. 4.

Operations performed in Steps S302 to S304 and S310 to S312 illustrated in FIG. 4 may be the same as the operations performed in Steps S202 to S204 and S212 to S214 illustrated in FIG. 3, and thus detailed description thereof will be omitted.

In FIGS. 2 and 3, a case in which the second wireless communication unit 220 of the portable device 20 transmits a first distance measurement signal, and the second wireless communication unit 120 of the in-vehicle device 10 transmits a second distance measurement signal as a response to the first distance measurement signal has been illustrated.

On the other hand, a first distance measurement signal according to this embodiment may be transmitted by the second wireless communication unit 120 of the in-vehicle device 10.

In this case, after the first wireless communication unit 110 receives an Ack signal in Step S304, the control unit 140 of the in-vehicle device 10 causes the second wireless communication unit 120 to transmit a first distance measurement signal (S306).

In addition, the control unit 240 of the portable device 20 causes the second wireless communication unit 220 to transmit a second distance measurement signal as a response to the first distance measurement signal (S308).

The control unit 140 of the in-vehicle device 10 may acquire a result of distance measurement from the second wireless communication unit 120 and execute a second authentication process on the basis of a result of the distance measurement or may acquire information relating to the time ΔT1 and the like from the second wireless communication unit 120, execute distance measurement, and execute a second authentication process on the basis of a result of the distance measurement.

As above, the flow of the operations performed by the system 1 according to this embodiment has been described using specific examples. As illustrated in FIGS. 2 to 4, the flow of the operations performed by the system 1 according to this embodiment can be flexibly modified.

2. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, in the embodiment described above, although an example in which the first communication device that is an authenticating side is the in-vehicle device 10, and the second communication device that is a side to be authenticated is the portable device 20 has been described, the present invention is not limited to such an example. The roles of the in-vehicle device 10 and the portable device 20 may be reversed, and the roles may be dynamically interchanged. In addition, distance measurement and authentication may be performed between in-vehicle devices 10.

Furthermore, for example, in the embodiment described above, although an example in which the present invention is applied to a smart entry system has been described, the present invention is not limited to such an example. The present invention can be applied to an arbitrary system that performs distance measurement and authentication by transmitting and receiving signals. For example, the present invention can be applied to a pair including two arbitrary devices among a portable device, a vehicle, a smartphone, a drone, a building, an electric appliance, and the like. In addition, the pair may include two devices of the same kind or may include two devices of different kinds. In such a case, one device operates as a first communication device, and the other device operates as a second communication device.

Furthermore, for example, in the embodiment described above, although a signal of the UHF band/a signal of the LF band has been described as a signal satisfying the first wireless communication standard, and a UWB signal has been described as a signal satisfying the second wireless communication standard, the present invention is not limited to such an example. For example, Wi-Fi (a registered trademark), Bluetooth (a registered trademark), or the like may be used as the first wireless communication standard. In addition, for example, a device that uses infrared rays may be used as the second wireless communication standard.

A series of processes performed by each device described here may be realized by software, hardware, or software and hardware in combination. For example, programs composing the software is stored in a non-transient storage medium disposed inside or outside of each device in advance. For example, each of the programs is read by a RAM at the time of execution using a computer and is executed by a processor such as a CPU. For example, the storage medium is a magnetic disk, an optical disc, a magneto-optical disc, a flash memory, or the like.

In addition, the computer programs described above may be distributed, for example, through a network without using a storage medium.

What is claimed is:

1. A communication device, comprising:
 a controller configured to control a process relating to transmission or reception of a first authentication signal and a second authentication signal used for a first authentication process that is authentication between the communication device and another communication device; and a storage, wherein the controller further
controls a second authentication process that is authentication different from the first authentication process, and
starts a process relating to transmission or reception of signals used for the second authentication process before transmission or reception of the first authentication signal, and wherein carrier frequency of the first authentication signal and the second authentication signal is lower than carrier frequency of signals used for the second authentication process, wherein the controller of the communication device generates and transmits the first authentication signal to the another communication device, without a result of a distance measurement from the second authentication process, and wherein another controller in the another communication device generates and transmits the second authentication signal to the communication device, with the result of the distance measurement from the second authentication process.

2. The communication device according to claim 1,
wherein the first authentication process is an authentication process based on the first authentication signal transmitted by one of the communication device and the another communication device and a second authentication signal transmitted by the other of the communication device and the another communication device as a response to the first authentication signal, and
wherein the controller starts a process relating to transmission or reception of signals used for the second authentication process before transmission or reception of the first authentication signal.

3. The communication device according to claim 1,
wherein the second authentication process includes distance measurement for estimating a distance between the communication device and the another communication device and an authentication process based on a result of the distance measurement.

4. The communication device according to claim 3,
wherein the distance measurement includes
transmission of a first distance measurement signal from one of the communication device and the another communication device,
reception of a second distance measurement signal from the other of the communication device and the another communication device as a response to the first distance measurement signal, and
estimation of a distance between the communication device and the another communication device on the basis of times required for the first distance measurement signal and the second distance measurement signal.

5. The communication device according to claim 4,
wherein the controller starts the process relating to transmission or reception of the first distance measurement signal after controlling transmission of an Ack signal as a response to a wakeup signal or after reception of the Ack signal.

6. The communication device according to claim 3,
wherein signals are transmitted and received in compliance with a first wireless communication standard in the first authentication process, and
wherein signals are transmitted and received in compliance with a second wireless communication standard using a carrier wave of a frequency different from a frequency of a carrier wave in the first wireless communication standard in the second authentication process.

7. The communication device according to claim 6,
wherein signals are transmitted and received in compliance with the second wireless communication standard using a carrier wave of a frequency higher than a frequency of a carrier wave in the first wireless communication standard in the second authentication process.

8. The communication device according to claim 3,
wherein the controller approves the second authentication process in a case in which the distance between the communication device and the another communication device is estimated to be in a prescribed range on the basis of a result of the distance measurement.

9. The communication device according to claim 1,
wherein the communication device is mounted in a vehicle, and
wherein the controller causes a controlled device, which is included in the vehicle, to execute a prescribed process in a case in which both the first authentication process and the second authentication process are approved.

10. The communication device according to claim 3,
wherein the controller causes the another communication device to transmit a result of the distance measurement.

11. The communication device according to claim 10,
wherein the controller transmits the second authentication signal in which a result of the distance measurement is included to the another communication device.

12. The communication device according to claim 9,
wherein the communication device is carried by a user.

13. A system, comprising:
a first communication device; and
a second communication device,
wherein the first communication device includes a first controller configured to control a process relating to transmission of a first authentication signal used for a first authentication process that is authentication between the first communication device and the second communication device and reception of a second authentication signal,
wherein the second communication device includes a second controller configured to control a process relating to reception of the first authentication signal and transmission of the second authentication signal,
wherein the second controller transmits a signal used for a second authentication process that is authentication different from the first authentication process before reception of the first authentication signal,
wherein carrier frequency of the first authentication signal and the second authentication signal is lower than carrier frequency of signals used for the second authentication process,
wherein the controller of the communication device generates and transmits the first authentication signal to the another communication device, without a result of a distance measurement from the second authentication process, and wherein another controller in the another communication device generates and transmits the second authentication signal to the communication device, with the result of the distance measurement from the second authentication process.

14. The communication device according to claim 1, wherein the communication device performs ranging by a UWB signal before transmitting and receiving the first authentication signal and the second authentical signal, which are LF/UHF authentication signals, and includes a result of the ranging in the second authentication signal.

* * * * *